US009920278B2

(12) United States Patent
Liu et al.

(10) Patent No.: US 9,920,278 B2
(45) Date of Patent: Mar. 20, 2018

(54) METHOD FOR PRODUCING HIGH QUALITY ANIMAL OIL WITH LOW CHOLESTEROL LEVELS

(71) Applicants: Yuanfa Liu, Wuxi (CN); Qingling Wang, Wuxi (CN); Jiang Jiang, Wuxi (CN); Jinwei Li, Wuxi (CN)

(72) Inventors: Yuanfa Liu, Wuxi (CN); Qingling Wang, Wuxi (CN); Jiang Jiang, Wuxi (CN); Jinwei Li, Wuxi (CN)

(73) Assignee: Jiangnan University, Wuxi, JS (CN)

( * ) Notice: Subject to any disclaimer, the term of this patent is extended or adjusted under 35 U.S.C. 154(b) by 67 days.

(21) Appl. No.: 14/503,824

(22) Filed: Oct. 1, 2014

(65) Prior Publication Data

US 2015/0173389 A1 Jun. 25, 2015

(30) Foreign Application Priority Data

Dec. 23, 2013 (CN) .......................... 2013 1 0718952

(51) Int. Cl.
*A23D 9/04* (2006.01)
*C11B 3/16* (2006.01)
*C11B 1/02* (2006.01)

(52) U.S. Cl.
CPC ................ *C11B 3/16* (2013.01); *C11B 1/025* (2013.01)

(58) Field of Classification Search
CPC .................................. C11B 1/025; C11B 3/16
See application file for complete search history.

(56) References Cited

U.S. PATENT DOCUMENTS 6,129,945 A * 10/2000 Awad ..................... A23C 15/14 426/417
6,303,803 B1 * 10/2001 Kodali ................. A23C 15/145 426/417

OTHER PUBLICATIONS

Jiang et al. (CN 103289812) 2 pages Sep. 11, 2013 Derwent Abstract.*
Hermey et al. (DE 102007023438) 1 page Nov. 20, 2008 Derwent Abstract.*
Li et al. (CN 102586065) Derwent Abstract Jul. 18, 2012 2 pages.*
Liu,Ye, Preparation of cholesterol reduced lard by treatment with b-cyclodextrin. China Oils and Fats. 2005, 30 (12):10-12.
Tang, Feng et al. Investigation of aqueous enzymatic extracting of fish oil from the entrails of chub. Food Science and Technology. 2007, 32(1):216-218.

* cited by examiner

*Primary Examiner* — Felicia C Turner
(74) *Attorney, Agent, or Firm* — Lili Chen

(57) ABSTRACT

The invention provides a method for producing high-quality lard or beef tallow with low cholesterol content. The method of the invention uses enzyme hydrolysis, centrifugation separation and homogenization-assisted embedding technique to obtain high-quality lard or beef tallow with low cholesterol levels. The method uses aqueous enzymatic extraction (AEE) techniques to separate lard or beef tallow from the raw material of pork or beef fat, and uses the homogenization-assisted embedding technique to remove cholesterol from the lard and beef tallow products. The method of the invention produces high quality lard with good oxidative stability at a high yield and can meet the Chinese national standard for first grade lard. The lard of the invention needs no further degumming process, eliminating the tedious refinery steps.

5 Claims, No Drawings

METHOD FOR PRODUCING HIGH QUALITY ANIMAL OIL WITH LOW CHOLESTEROL LEVELS

CROSS-REFERENCES AND RELATED APPLICATIONS

This application claims the benefit of priority to Chinese Application No. CN201310718952.2, entitled "A method of producing high quality animal oil with low cholesterol levels", filed Dec. 23, 2013, which is herein incorporated by reference in its entirety.

BACKGROUND OF THE INVENTION

Field of the Invention

The invention belongs to the field of food processing technology and, especially to the field of animal oil processing technology. Particularly, it relates to a method for producing high-quality lard or beef tallow with low cholesterol levels.

Background of the Invention

The self-sufficiency degree of China's edible oil is less than 40%, resulted in China's high dependency on foreign trade for edible oil. Finding new edible oil sources is an important way to alleviate China's oil supply security issues. China has abundant animal oil resources. According to statistics, China is the largest pork-producing country and the lard production is also No. 1 in the world. The production of beef tallow in China is one of the largest in the world as well. Therefore, the full development of animal oil resources like lard and beef tallow has great significance in solving the problem of insufficient self-supply of edible oil in China.

Lard is rich in nutrition, containing abundant saturated fatty acids and polyene alcohol, which are the main sources for human essential fatty acids and fat-soluble vitamins. It is also an important source for α-lipoprotein and arachidonic acid. Lard has unique flavor and can send out mouthwatering smell in the process of cooking. It can improve the smoothness of food texture when it is covered on the surface of the food during cooking. Moreover, lard is also an essential heat-transfer medium, which can increase cooking temperature, shorten cooking time and disperse unpleasant odor.

As an anther animal oil source, beef tallow has white color, abundant fatty acids and no undesirable flavor. Beef tallow is widely used in the food industry, such as bakery products (bread, biscuit, cake, etc.), shortening, margarine, frying oil, instant noodle, frozen foods, flavorings, etc.

Currently, dry method and wet method are the two main ways to produce animal oil, such as lard or beef tallow. In the dry method, lard or beef tallow is decocted from fat issue by high temperature, and is then squeezed and filtered to remove scraps. Because of the difficulty to control the temperature or long time of heating, the lard made of the dry method has problems such as darker color, increased acidity, higher degree of oxidation, and increased levels of malonaldehyde. The quality of lard and beef tallow made from this method is very low, needs refinery steps to obtain edible oil, and has very low yield. The wet method is to heat the fat tissue in the presence of water. The lard and beef tallow made of the wet method has large amount of moisture, poor flavor, easy to rancidity and high cholesterol levels (e.g. unrefined lard has an average cholesterol level of 100-150 mg/100 g, and refined lard still has an average cholesterol level of 50-70 mg/100 g). The above-mentioned disadvantages of the traditional processing methods have been a long-time problem that has limited the development and application of the animal oils.

Aqueous enzymatic extraction (AEE) is a new oil extraction technology that has been widely studied in recent years. The aqueous enzymatic method has many advantages, including high oil yields, white color of the final product, low energy consumption and low pollution. AEE has been applied in the extraction of many plant oils. However, there is no report about using AEE for the extraction of lard or beef tallow. There is a need to develop an AEE-based method for extracting animal oils. This invention satisfies this need and provides other benefits as well.

BRIEF SUMMARY OF THE INVENTION

To solve above-mentioned problems, it is the goal of the present invention to provide a method for producing high-quality lard or beef tallow with low cholesterol levels. The present invention provides a method of extracting lard or beef tallow using AEE at low temperatures and decreasing the cholesterol level of the lard or beef tallow by use of a homogenization-assisted embedding technique.

In some embodiment, the present invention provides a method of producing lard or beef tallow with low cholesterol levels, comprising hydrolyzing the raw materials with a protease, separating crude lard or beef tallow by a sedimentation method, and decreasing the cholesterol level using a homogenization-assisted embedding technique.

In some embodiment, the present invention provides a method of producing lard or beef tallow with low cholesterol levels, comprising the steps of:

a) breaking the raw materials into mince;
b) mixing the minced raw materials with water at a mass ratio of 2:1 to 1:3 (w:w, minced raw material:water);
c) hydrolyzing proteins in the mixture by incubating with a protease (500-1300 U/g protein) at 45-55° C., pH 7-9 for 2-3 hours to obtain a crude lard or beef tallow;
d) separating the crude lard or beef tallow using centrifugation or sedimentation separation;
f) adding and mixing a starch-based embedding material to water at a ratio of 5-10% (w/w) to make an embedding solution, homogenizing the crude lard or beef tallow in the embedding solution at 44-55° C. for 10 to 15 minutes, centrifuging the homogenized mixture and obtaining the high quality lard or beef tallow with low cholesterol levels from the top layer of the centrifuged product.

In a preferred embodiment, the raw material for making lard is pig fat meat or pig suet, containing 83-95% (w/w) raw fat and 0-5% (w/w) protein; and the raw material for making beef tallow is beef suet, containing 91-95% (w/w) raw fat and 1-2% (w/w) protein.

In a preferred embodiment, the protease used in the step c) is ALCALASE™ (also named *Bacillus subtilis* alkaline proteinase), FLAVOURZYME™ (a proteinase preparation from *Aspergillus oryzae*, sold at Sigma-Aldrich), neutral protease, papain or a combination of proteases above.

In a preferred embodiment, centrifugation in step d) is performed at the speed of 3500~4500 r/min for 10-20 minutes.

In a preferred embodiment, starch-based embedding material based in the step f) is β-cyclodextrin or modified starch. The modified starch includes, but not limited to, hydroxymethylstarch (Fuhua drier factory, Gongyi, Heinan, China), maltodextrin (Chiwei Co. Ltd, Shanghai, China), maize modified starch, potato modified starch and cassava modified starch (Yongyi food raw materials Co. Ltd, Guangzhou, China).

In a preferred embodiment, the crude lard or beef tallow is homogenized using a high speed dispenser at the speed of 9500-18000 rpm for 2-15 minutes in step f).

In a preferred embodiment, the centrifugation in step f) is operated at the speed of 3500-4500 rpm.

The yields of lard and beef tallow produced by the invented method are 90%-97% and 94~98%, respectively.

The cholesterol levels of lard or beef tallow produced by the invented method is 1-5 mg/100 g.

The present invention has the following advantages:

(1) The present invention provides a method to extract lard or beef tallow from pig or beef fat using Aqueous Enzymatic Extraction.

(2) The lard or beef tallow made by the invented method has high oil yield, good flavor, high quality, great anti-oxidative ability and a low cholesterol level. Compared with traditional methods, the invented method does not require refinery steps, uses simpler equipment, has safer operation procedure, consumes less energy, and produces much less pollution.

(3) The present invention provides a method to decrease cholesterol levels of lard or beef tallow using homogenous-assisted embedding technique, which can easily and effectively remove cholesterol from lard or beef tallow.

DETAILED DESCRIPTION OF THE INVENTION

The present invention provides a method for producing high quality lard or beef tallow with low cholesterol levels, comprising extracting animal oil from pig or beef fat using protease hydrolysis, separating crude lard or beef tallow using centrifugation, and removing cholesterol to obtain the high quality lard or beef tallow by homogenization-assisted embedding techniques. The homogenization-assisted embedding techniques comprise homogenizing crude lard and beef tallow in a starch-based material embedding solution to allow formation of cholesterol and starch microcapsules and removing cholesterol-starch microcapsules by centrifugation. This is a fast and effective method of removing cholesterol and obtaining the high quality lard or beef tallow product.

First, the frozen animal fat issues are chopped or cut into mince or small granules (depending on the type of raw materials) and mixed with water at a mass ratio of 2:1-1:3 (minced meat/water). A Proteinase (500-1300 U/g) such as ALCALASE™, FLAVOURZYME™, neutral protease, papain or compound protease is added to hydrolyze the minced meat at 45~55° C., pH 7-9 for 2-3 hours. Secondly, the hydrolyzed mixture is centrifuged at a speed of 3500-4500 rpm for 10-20 minutes. After centrifugation, the mixture is separated into three layers with the crude animal oil at the top layer, a microemulsion middle layer and an aqueous bottom layer. Obtain the crude animal oil from the top layer. Finally, mix the crude animal oil with the same volume water solution containing 5-10% starch-based embedding material to obtain a lard or beef tallow embedding mixture. Use a high speed dispenser to homogenize the lard or beef tallow embedding mixture at 9500-18000 rpm for 2-15 minutes. The homogenized mixture is centrifuged at 3500-4500 rpm for 10-20 minutes, and the high quality lard or beef tallow is obtained from the top layer of the centrifuged product.

In a preferable embodiment of the invention, pig fat meat with 83%-87% raw fat and 3-5% protein or beef suet with 91%-95% raw fat and 1-2% protein is used as the raw material to make the high quality lard or beef tallow.

The analytic methods used in the invention are:

Measurement of protein content: Kjeldahl method;

Measurement of fat content: Soxhlet extraction method;

Measurement of moisture and volatile content: GB/T 5528-2008 (national standard of China);

Measurement of acid value: GB/T 5530-2005;

Measurement of iodine value: GB/T 5532-2008;

Measurement of peroxide value: GB/T 5538-2005;

Measurement of color and luster: GB/T 22460-2008

Measurement of saponification value: GB/T 5534-2008;

Measurement of cholesterol content: GB/T 5009.128-2003;

Measurement of trans fat content: gas chromatography method;

Measurement of oxidation stability: determined by oxidative stability instrument;

Oil yield=the amount of extracted oil/total oil in raw material;

cholesterol removal rate=(cholesterol content of lard extracted by AEE-cholesterol content of lard after homogenization-assisted embedment)/cholesterol content of lard extracted by AEE.

The following examples are provided for illustrative purposes, and are not intended to limit the scope of the invention.

Example 1

Pig fat meat was chopped into mince and mixed with water at the ratio of 1:1 and was adjusted to pH 8-9 using 2 mol/L NaOH. ALCALASE™ (500 U/g protein) was added to the minced meat, and hydrolyzed at 50° C. for 2-3 hours. The hydrolyzed mixture was centrifuged at the speed of 3500-4500 rpm for 10-20 minutes. After centrifugation, the mixture was separated into three layers, namely, the top layer (oil layer), the middle layer (microemulsion phase layer) and the low layer (aqueous and residues layer). The crude lard was obtained from the top layer of the centrifugation product.

5% (w/w) β-cyclodextrin was added to water to make an embedding solution. The crude lard was added and mixed with equal volume of the embedding solution, and was homogenized in a high speed dispenser at 13,500 rpm, under 40-60° C. for 10 minutes. After homogenization, the homogenized mixture was centrifuged at 4500 rpm for 10 minutes and high quality lard with low cholesterol levels was obtained from the top layer of the centrifugation product. The high quality lard was sealed and stored in the dark.

Example 2

Pig suet was chopped into mince and mixed with water at the ratio of 1:2 and was adjusted to pH 8-9 using 2 mol/L NaOH. ALCALASE™ (1000 U/g protein) was added to the minced meat, and hydrolyzed at 55° C. for 2-3 hours. The hydrolyzed mixture was centrifuged at the speed of 3500-4500 rpm for 10-20 minutes. After centrifugation, the mixture was separated into three layers, namely, the top layer (oil layer), the middle layer (microemulsion phase layer) and the low layer (aqueous and residues layer). The crude lard was obtained from the top layer of the centrifugation product.

10% (w/w) maltodextrin was added to water to make an embedding solution. The crude lard was added and mixed with equal volume of the embedding solution, and was homogenized in a high speed dispenser at 18,000 rpm, under 40-60° C. for 5 minutes. After homogenization, the homogenized mixture was centrifuged at 4000 rpm for 10 minutes and high quality lard with low cholesterol levels was obtained from the top layer of the centrifugation product. The lard was sealed and stored in the dark.

Example 3

Beef suet was chopped into small granules, mixed with water at the ratio of 1:2 and adjusted to pH 8-9 using 2 mol/L NaOH. ALCALASE™ (800 U/g protein) was added to the minced meat, and hydrolyzed at 55° C. for 2-3 hours. The hydrolyzed mixture was centrifuged at the speed of 3500-4500 rpm for 10-20 minutes. After centrifugation, the mixture was separated into three layers, namely, the top layer (oil layer), the middle layer (microemulsion phase layer) and the low layer (aqueous and residues layer). The crude beef tallow was obtained from the top layer of the centrifugation product.

8% (w/w) modified potato starch was added to water to make an embedding solution. The crude beef tallow was added and mixed with equal volume of the embedding solution, and was homogenized in a high speed dispenser at 9,500 rpm, under 55° C. for 2-15 minutes. After homogenization, the homogenized mixture was centrifuged at 4500 rpm for 10 minutes and high quality lard with low cholesterol levels was obtained from the top layer of the centrifugation product. The beef tallow was sealed and stored in the dark.

Example 4

Beef suet was chopped into small granules, mixed with water at the ratio of 1:1 and adjusted to pH 8.0 using 2 mol/L NaOH. (500 U/g protein) was added to the minced meat, and hydrolyzed at 50° C. for 2-3 hours. The hydrolyzed mixture was centrifuged at the speed of 3500-4500 rpm for 10-20 minutes. After centrifugation, the mixture was separated into three layers, namely, the top layer (oil layer), the middle layer (microemulsion phase layer) and the low layer (aqueous and residues layer). The crude beef tallow was obtained from the top layer of the centrifugation product.

8% (w/w) β-cyclodextrin was added to water to make an embedding solution. The crude beef tallow was added and mixed with equal volume of the embedding solution, and was homogenized in a high speed dispenser at 9,500 rpm, under 40-60° C. for 8 minutes. After homogenization, the homogenized mixture was centrifuged at 4500 rpm for 10 minutes and high quality lard with low cholesterol levels was obtained from the top layer of the centrifugation product. The beef tallow was sealed and stored in the dark.

Example 5

The high-quality lard made in Example 1 was compared with commercially available lard products and tested against China's national standards for first grade lard. The lard of the invention has many advantages, such as high oil yield (93-96%), good flavor, good anti-oxidative ability, and low cholesterol levels. In addition, the lard of the invention does not need further refinery steps, saving time, energy and production cost.

The analytic methods used in the invention are:

Measurement of protein content: Kjeldahl method;

Measurement of fat content: Soxhlet extraction method;

Measurement of moisture and volatile content: GB/T 5528-2008 (national standard of China);

Measurement of acid value: GB/T 5530-2005;

Measurement of iodine value: GB/T 5532-2008;

Measurement of peroxide value: GB/T 5538-2005;

Measurement of color and luster: GB/T 22460-2008

Measurement of saponification value: GB/T 5534-2008;

Measurement of cholesterol content: GB/T 5009.128-2003;

Measurement of trans fat content: gas chromatography method;

Measurement of oxidant stability: determined by oxidative stability instrument.

TABLE 1

Oxidative stability of different lard products

| Example | Oxidative induction time/h |
|---|---|
| Yihai Kerry 8 pure edible lard | 3.78 |
| Yihai Kerry raw oil | 0.74 |
| Lard made by wet method | 0.68 |
| Lard made by dry method | 0.47 |
| Lard extracted by AEE | 1.51 |
| High-quality lard with low cholesterol | 1.53 |

Compared with Yihai Kerry raw oil, the lard of the invention has a greater oxidative stability. Although oxidative induction time of lard of the invention is lower than that of Yihai Kerry 8 pure edible lard, it is because of the addition of Vitamin E in the Yihai Kerry 8 pure edible lard. It is shown that the VE content of Yihai Kerry 8 pure edible lard is 21 times more than that of lard of the invention. During the enzymatic hydrolysis, the proteins are hydrolyzed into many peptide fragments. Some peptide fragments have anti-oxidative ability and most of these anti-oxidative peptides are hydrophobic, which allow them to remain in the oil phase. Therefore, the lard made of AEE method has greater oxidative stability than lards made of traditional methods.

TABLE 2

Cholesterol content of different lard products

| Example | Cholesterol content (mg/100 g) |
|---|---|
| Yihai Kerry 8 pure edible lard | 65.522 |
| Yihai Kerry raw oil | 113.371 |
| Lard extracted by AEE | 55.312 |
| High-quality lard with low cholesterol | 2.589 |

The result of Table 2 shows that the lard after aqueous enzymatic extraction has lower level of cholesterol than lards made by traditional methods (e.g. Yihai Kerry 8 pure edible lard, and Yihai Kerry raw lard). The homogenization-assisted embedding process has further lowered the cholesterol level in the lard product, making further refinery steps unnecessary.

TABLE 3

Comparison of physical and chemical indexes of different lards

| Physical and chemical indexes | China national standards | | Yihai Kerry 8 pure edible lard | Yihai Kerry raw oil | Lard extracted by AEE | High-quality lard with low cholesterol |
|---|---|---|---|---|---|---|
| Melting point (° C.) | 32-45 | | 35.6-36.4 | 35.8-36.7 | 36.1-37.2 | 35.9-36.7 |
| Color | | | | | | |
| Red value | — | | 1.4 | 4.1 | 0.5 | 0.5 |
| Yellow value | — | | 5.2 | 15 | 1.6 | 1.3 |
| | First grade | Second grade | | | | |
| Moisture content (%) | ≤0.20 | ≤0.25 | 0.032 | 0.13 | 0.056 | 0.058 |
| Acid value (mg/g) | ≤1.0 | ≤1.3 | 0.115 | 4.65 | 0.355 | 0.217 |
| iodine value (g/100 g) | 46-70 | | 55.521 | 61.969 | 67.594 | 63.448 |
| peroxide value (meq/kg) | ≤0.1% | | 1.806 | 9.111 | 0.638 | 0.512 |
| saponification value (KOH) (mg/g) | 190-202 | | 193.308 | 195.732 | 197.075 | 196.453 |
| Trans fatty acids | — | | 0.226 | 0.432 | 0.163 | 0.157 |

The result in Table 3 shows that major chemical and physical indexes, such as moisture content, acid value, iodine value, peroxide value, of the lard produced by the invented method are very low and have met China's national standards for first grade lard. The invented method for producing high quality lard has eliminated the refinery steps normally required for deacidification, bleaching, and deodorization process, simplified the production workflow, greatly reduced the operation time and production costs, and thus significantly increased economic efficiency. In addition, the entire oil-making process is performed under mild conditions, produces a lard with extremely low levels of trans-fatty acids and has reached the "zero trans" standard. Using the lard of the invention in daily life can prevent potential harm to the human body due to excessive intake of trans fatty acids.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A method of producing high-quality lard or beef tallow with low cholesterol levels, comprising the steps of:

a) breaking the raw materials into mince or small granules;

b) mixing the minced raw materials with water at a minced raw material:water mass ratio of 2:1 to 1:3;

c) hydrolyzing proteins in the mixture by incubating with a protease at a concentration of 500-1300 U/g protein at 45-55° C., pH 7-9 for 2-3 hours to obtain crude lard or beef tallow;

d) separating the crude lard or beef tallow using centrifugation at 3500-4500 rpm for 10-20 minutes; and f) adding and mixing a starch-based embedding material to water at a mass ratio of 5-10% to make an embedding solution, homogenizing the crude lard or beef tallow in the embedding solution at 9500 rpm, 44-55° C. for 2 to 15 minutes, centrifuging the homogenized mixture at 3500-4500 rpm and obtaining the high quality lard and beef tallow with low cholesterol levels from the top layer of the centrifuged product, wherein the yield of lard is 90%-97% and the yield of beef tallow is 94%-98% and wherein the cholesterol level of the high quality lard or beef tallow is 1-5 mg/100 g.

2. The method of claim 1, wherein the raw materials for making lard is pig fat meat or pig suet, containing 83-95% raw fat and 0-5% protein; and wherein the raw material for making beef tallow is beef suet, containing 91-95% raw fat and 1-2% protein.

3. The method of claim 1, wherein the protease in the step c) is *Bacillus subtilis* alkaline proteinase, neutral protease, papain or a combination of the proteases above.

4. The method of claim 1, wherein the homogenization-assisted embedding technique comprises homogenizing crude lard and beef tallow in a starch-based embedding solution at 9500 rpm to allow formation of cholesterol and starch microcapsules, and removing cholesterol-starch microcapsules by centrifugation.

5. The method of claim 1, wherein the starch-based embedding material in step f) is β-cyclodextrin or modified starch.

* * * * *